US006944508B2

(12) United States Patent
Watanabe et al.

(10) Patent No.: US 6,944,508 B2
(45) Date of Patent: Sep. 13, 2005

(54) ADAPTIVE VALUE GENERATING APPARATUS, ADAPTIVE PROCEDURE CONTROL PROGRAM, AND ADAPTIVE VALUE GENERATING PROGRAM

(75) Inventors: Satoru Watanabe, Susono (JP); Akira Ohata, Mishima (JP); Masato Ehara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 10/702,508

(22) Filed: Nov. 7, 2003

(65) Prior Publication Data

US 2004/0111168 A1 Jun. 10, 2004

(30) Foreign Application Priority Data

Dec. 4, 2002 (JP) ...................................... 2002-352028

(51) Int. Cl.[7] .............................................. G05B 13/02
(52) U.S. Cl. .............................. 700/51; 700/28; 700/37; 700/46; 700/52; 700/53; 700/78; 702/179; 702/180; 702/181
(58) Field of Search .............................. 700/28, 30, 31, 700/32, 37, 46, 51, 52, 53, 73, 78; 702/179, 180, 181

(56) References Cited

U.S. PATENT DOCUMENTS 4,890,239 A  12/1989  Ausschnitt et al.
6,047,220 A  * 4/2000  Eryurek ........................ 700/28
6,155,267 A  * 12/2000  Nelson ......................... 128/899
6,633,782 B1 * 10/2003  Schleiss et al. ................ 700/26
6,828,165 B2 * 12/2004  Tanaka et al. ................. 438/14
6,835,175 B1 * 12/2004  Porumbescu ................. 600/300
6,862,514 B2 * 3/2005  Ehara ......................... 701/102

FOREIGN PATENT DOCUMENTS

| JP | A 63-170563 | 7/1988 |
| JP | A 2-125414 | 5/1990 |
| JP | A 09-044466 | 2/1997 |
| JP | A 2000-250603 | 9/2000 |
| JP | A 2000-315108 | 11/2000 |
| JP | A 2000-321174 | 11/2000 |
| JP | A 2001-236338 | 8/2001 |
| JP | A 2002-206456 | 7/2002 |

* cited by examiner

Primary Examiner—Ramesh Patel
(74) Attorney, Agent, or Firm—Oliff & Berridge, PLC

(57) ABSTRACT

The present invention is directed to generate an adaptive value in a short time. An adaptive value generating program has an adaptive procedure control program and a DOE tool. The DOE tool is a general statistical processing tool. The adaptive value procedure generating program functions as an interface between a measuring apparatus and the DOE tool. In a data obtaining process, the adaptive value procedure generating program automatically determines a method of selecting a measurement point and passes the result to the DOE tool. Selection of an approximation function and selection of an optimization method are automated. Further, evaluation of a final approximation expression and determination of confirmation data are also automated.

19 Claims, 13 Drawing Sheets

ADAPTIVE VALUE GENERATING APPARATUS, ADAPTIVE PROCEDURE CONTROL PROGRAM, AND ADAPTIVE VALUE GENERATING PROGRAM

BACKGROUND OF THE INVENTION

1. Field of the Invention

The present invention relates to an adaptive value generating apparatus, an adaptive procedure control program, and an adaptive value generating program for generating an adaptive value indicative of the state of an object under a predetermined control condition.

2. Description of the Related Art

At the time of controlling an object by performing a required operation so as to be adapted to a purpose under a predetermined control condition, the relation between the condition and a control amount is sometimes determined by using a model, which is prepared as the model of the object to be controlled. The model is given as a function which outputs a control amount when a control condition is inputted and includes at least one parameter. To determine the parameter so as to make the model close to the actual object is called adaptation. To determine the control amount so as to meet the purpose of the control is called optimization.

For example, in order to control an engine as an internal combustion mounted on a vehicle, it is necessary to know the behavior of the engine under predetermined operating conditions. Consequently, a controller for controlling combustion of a fuel in the engine pre-stores a map indicative of the state of the engine under each of various operating conditions, and generally determines a control amount with reference to the map (for example, Japanese Patent Application Laid-Open Nos. 2000-321174 and 63-170563). Therefore, an optimized adaptive value is stored in the map.

To obtain the optimized adaptive value, the following processes are needed, that is, first, selecting a model to be a base; second, executing the measurement with an actual apparatus; third, calculating the parameters of the model on the basis of the actual measurement values; and fourth, calculating an optimized adaptive value by using the model.

However, though a general calculation program is used in a part of the processes, a system in which the whole processes are automated is not known. In the case of using a general calculation program, the operator has to input data in a form which can be interpreted by the calculation program. Consequently, there is an inconvenience such that the process is interrupted many times and it takes long time to obtain an optimized adaptive value.

Further, in a process requiring determination of the operator such as selection of a model to be a base, there is a problem such that plural processes for data entry are needed.

SUMMARY OF THE INVENTION

An object of the present invention is to provide an adaptive value generating apparatus, an adaptive procedure control program, and an adaptive value generating program capable of automatically or semi-automatically performing a series of processes.

An adaptive value generating apparatus according to the present invention is the one for generating an adaptive value indicative of a state of an object under a predetermined control condition, including: a statistical processing device for executing a statistical process when a set of an input value and an output value and a function including at least one parameter are designated, thereby determining a value of the parameter so that a calculation value of the function corresponding to the input value comes close to the output value and generating an approximation expression; and an adapting device for determining an approximation function for estimating a state of the object, outputting information designating the determined approximation function to the statistical processing device, outputting a measuring value, which is obtained by measuring the state of the object under the predetermined control condition, as the output value and the predetermined control condition as the input value to the statistical processing device, evaluating precision of the approximation expression on the basis of the calculation value and the measurement value when the approximation expression is received from the statistical processing device, and generating the adaptive value by using the approximation expression in the case where an error is within a predetermined range.

According to this invention, the adapting device can obtain an approximation expression by using the statistical processing device as a general part for determining parameters, so that the process for obtaining an approximation expression can be automated. When the precision of an approximation expression is sufficiently high, an adaptive value is generated by using the approximation expression, so that a very precise adaptive value can be generated and the evaluating process of the approximation expression can be automated. As a result, time required to generate an adaptive value can be greatly shortened. The adaptive value generating apparatus can take the form of, for example, a computer. The adapting device corresponds to, for example, a CPU for executing a program adapted to the object. The statistical processing device corresponds to, for example, a general statistical processing program.

The adaptive value generating apparatus may further include: a presenting device for presenting information to a user, thereby prompting an input; and an input device for outputting an output signal according to operation of the user. The adapting device makes the presenting device present information which helps the user to designate the approximation function, and determines the approximation function on the basis of the output signal. In this case, the user can receive the information which helps the user to designate an approximation function from the presenting device, so that the user can easily designate an approximation function. The presenting device corresponds to a display for providing information visually or a speaker for providing aural information. Preferably, the adapting device stores a plurality of approximation functions, and the information which helps the user to designate the approximation function is information indicative of the plurality of approximation functions. Further, a graph of the measurement value may be displayed.

Preferably, the statistical processing device derives an optimum point by using the approximation expression in accordance with a designated optimization method and outputs the optimum point to the adapting device, and the adapting device outputs information to designate the optimization method to the statistical processing device and settles the optimum point obtained from the statistical processing device as the adaptive value. In this case, the adapting device can designate an optimization method, so that the statistical processing device can execute optimization in accordance with the designated method.

Further, preferably, the adapting device outputs the information to designate the optimization method to the statistical processing device, determines whether the optimum point obtained from the statistical processing device satisfies a predetermined condition or not on the basis of a measurement value obtained by measuring the object and, when the predetermined condition is satisfied, settles the optimum point as the adaptive value. In this case, an optimum value is evaluated and, when the predetermined condition is satisfied, the optimum point is settled as an adaptive value. Consequently, reliability of the adaptive value can be improved. The predetermined condition is preferably that whether the optimum point satisfies the purpose of the control within the predetermined range or not can be determined.

Preferably, the adapting device generates the information to designate the optimization method on the basis of the approximation function. This is because the optimization method in which an error decreases according to an approximation function is determined. Alternately, the adapting device may determine the correspondence between an optimization method, which can be selected by the statistical processing device, and an approximation function in advance and designate the optimization method in accordance with the relation.

The above-described adaptive value generating apparatus may further include: a presenting device for presenting information to a user, thereby prompting for an input; and an input device for outputting an output signal according to operation of the user. The adapting device pre-stores kinds of optimization methods which can be used by the statistical processing device, makes the presenting device present information indicative of the kinds of the optimization methods, and generates the information to designate the optimization method on the basis of the output signal. In this case, the user can refer to the information indicative of the kinds of the optimization methods which can be used, so that the user can easily select an optimization method.

In addition, in the adaptive value generating apparatus, the object may be an engine used for a vehicle, and the predetermined control condition may be an operating condition of the engine.

The invention also provides an adaptive procedure control program for generating an adaptive value for controlling an object under a predetermined control condition by using a statistical processing tool which makes a computer execute a statistical process, wherein when a set of an input value and an output value and a function including at least one parameter are designated, the statistical processing tool determines the value of the parameter so that a calculation value of the function to the input value comes close to the output value, and generates an approximation expression in the computer, and the adaptive procedure control program makes the computer execute the steps of: determining an approximation function for estimating a state of the object; outputting information to designate the determined approximation function to the statistical processing tool; outputting a measurement value, which is obtained by measuring the state of the object under the predetermined control condition, as the output value, and the predetermined control condition as the input value to the statistical processing tool; evaluating precision of the approximation expression on the basis of the calculation value and the measurement value; and, generating the adaptive value by using the approximation expression when an error is within a predetermined range.

According to the invention, the adaptive procedure control program can calculate an adaptive value by using the statistical processing tool. As the statistical processing tool, a general program can be used irrespective of the kind of the object to be controlled. In the case such that the adaptive procedure is changed, it is enough to correct only the adaptive procedure control program. Therefore, the provided program can flexibly address various changes and corrections.

The invention also provides an adaptive value generating program for generating an adaptive value for controlling an object under a predetermined control condition, which makes a computer execute the steps of: determining an approximation function which includes at least one parameter and estimates a state of the object; inputting the predetermined control condition to the approximation function and obtaining a calculation value; determining the parameter so that the calculation value comes close to a measurement value obtained by measuring the state of the object under the predetermined control condition, thereby generating an approximation expression; and evaluating precision of the approximation expression on the basis of the calculation value and the measurement value and, when an error is within a predetermined range, generating the adaptive value by using the approximation expression.

According to the invention, the adaptive value generating program functions as a single program and automatically generates an adaptive value. Therefore, the process is not interrupted until an adaptive value is generated, so that time required to generate an adaptive value can be greatly shortened.

The invention also provides an adaptive value generating program for making a computer having an input device for outputting an output signal according to an operation of a user generate an adaptive value for controlling an object under a predetermined control condition, wherein the adaptive value generating program includes a statistical processing tool and an adaptive procedure control program for making the computer function as a device for executing a statistical process in accordance with an instruction and outputting a result of the process, and the adaptive procedure control program includes: a plurality of tool control modules for making the computer function as a device for inputting the instruction to the statistical processing tool and also receiving the result of the process; a plurality of processing modules for making the computer function as a device for executing a predetermined process; a procedure generating module for making the computer function as a device for selecting modules from the tool control modules and the processing modules on the basis of the output signal, and generating an execution procedure file to specify an executing order of the selected modules; and an execution module for making the computer function as a device for detecting execution of the execution procedure file on the basis of the output signal, executing a process in accordance with a procedure written in the execution procedure file, and generating the adaptive value.

According to the invention, by entering an instruction of combining appropriately the tool control modules and the processing modules, the operator of the computer can generate the execution procedure file for generating an adaptive value for controlling an object. Therefore, according to various circumstances such as the object to be controlled and the required precision, the adaptive procedure can be customized.

Preferably, the computer has a display device, and at least one of the plurality of processing modules, as the predetermined process, makes the display device display an input screen for prompting the user to input a predetermined instruction, receives the predetermined instruction on the basis of the output signal, and generates the instruction to be given to at least one of the tool control modules on the basis of the predetermined instruction. In this case, with respect to a process which is not suitable for automation, the entry process can be left to the user. Thus, flexible customization can be provided.

Preferably, the computer can transmit a measurement instruction to a measuring apparatus for measuring a state of the object and receive a measurement result, and at least one of the plurality of processing modules, as the predetermined process, generates the measurement instruction, transmits the measurement instruction to the measuring apparatus, and receives the measurement result from the measuring apparatus. In this case, with automatically performing transmission/reception to/from the measuring apparatus, an adaptive value can be generated.

DESCRIPTION OF THE PREFERRED EMBODIMENTS

Figure 1:
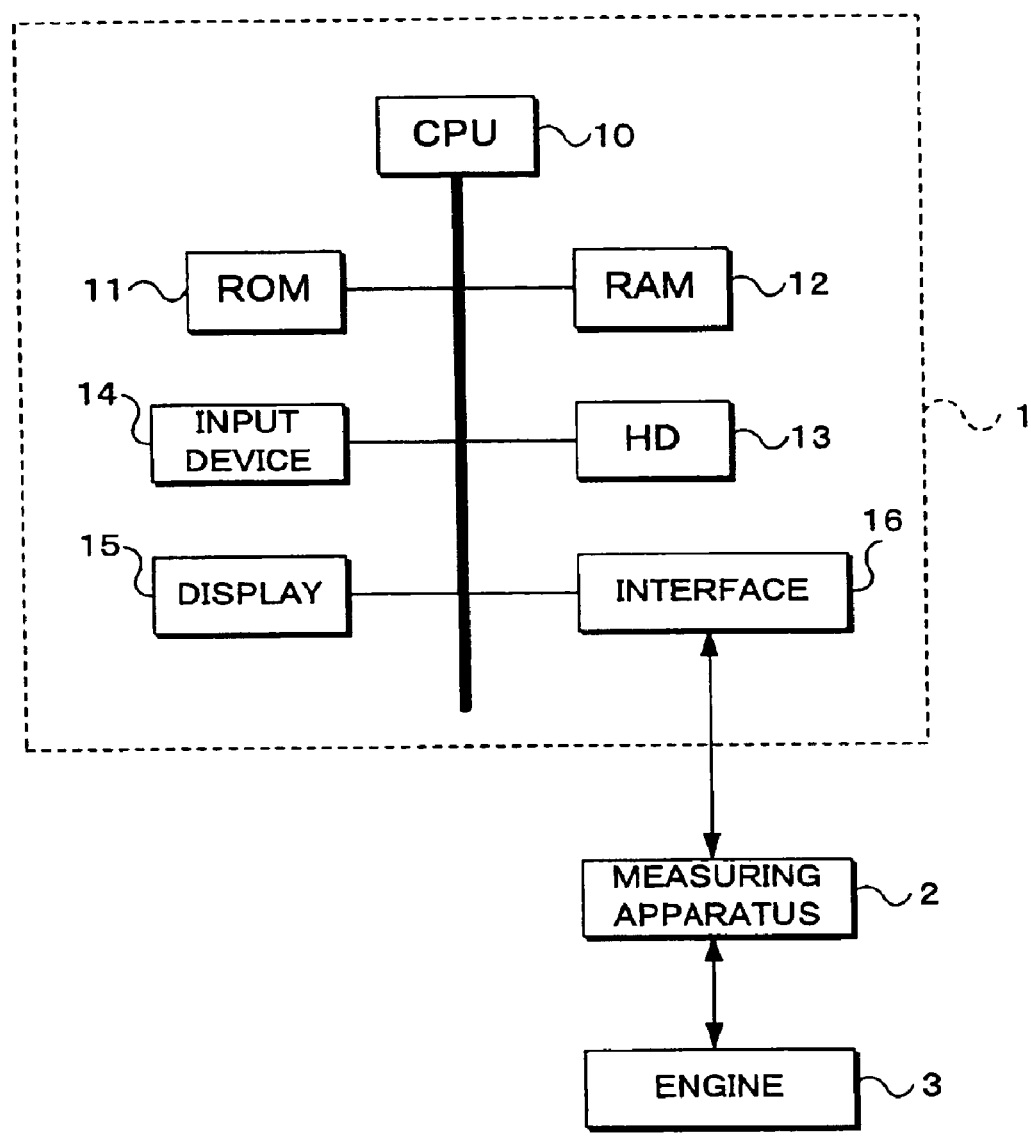
FIG. 1 is a block diagram of an adaptive value generating system using an adaptive value generating apparatus according to the present invention.

FIG. 1 is a block diagram showing an adaptive value generating system using an adaptive value generating apparatus according to an embodiment of the present invention. The adaptive value generating system has a computer 1, a measuring apparatus 2, and an engine 3 which is the object to be controlled. To the engine 3, various sensors such as a temperature sensor, a torque sensor, and an intake sensor are attached. Output signals of the sensors are inputted to the measuring apparatus 2. The measuring apparatus 2 can control operation timings of an intake valve and an exhaust valve of the engine 3, a lift amount of each of the values, opening of a fuel injection valve, and the like. The measuring apparatus 2 operates the engine 3 under predetermined operating conditions in accordance with an instruction from the computer 1. The state of the engine 3 is measured by the various sensors. The measuring apparatus 2 generates measurement data on the basis of output signals of the sensors and transmits the generated measurement data to the computer 1.

The computer 1 has a CPU 10, a ROM 11, a RAM 12, a hard disk 13, an input device 14, a display 15, and an interface 16 which are connected to each other via a bus. The CPU 10 functions as a control center of the computer 1 and executes various programs such as an adaptive value generating program. In the ROM 11, a boot program executed at the time of start-up is stored. The RAM 12 functions as a work area of the CPU 10, and stores data in process and the like. For example, measurement data and measurement instruction data, which will be described later, are stored. In the hard disk 13, a generated adaptive value and various data are stored.

The input device 14 functions as input means for an operator to input an instruction, and outputs a signal according to the operation of the operator. The input device 14 includes, for example, a keyboard and a mouse. The interface 16 has a function of performing communication with an external device. The CPU 10 can transmit an instruction to the measuring apparatus 2 and obtain measurement data from the measuring apparatus 2 via the interface 16. Also, measurement data can be accepted from another computer via the interface 16.

Figure 2:
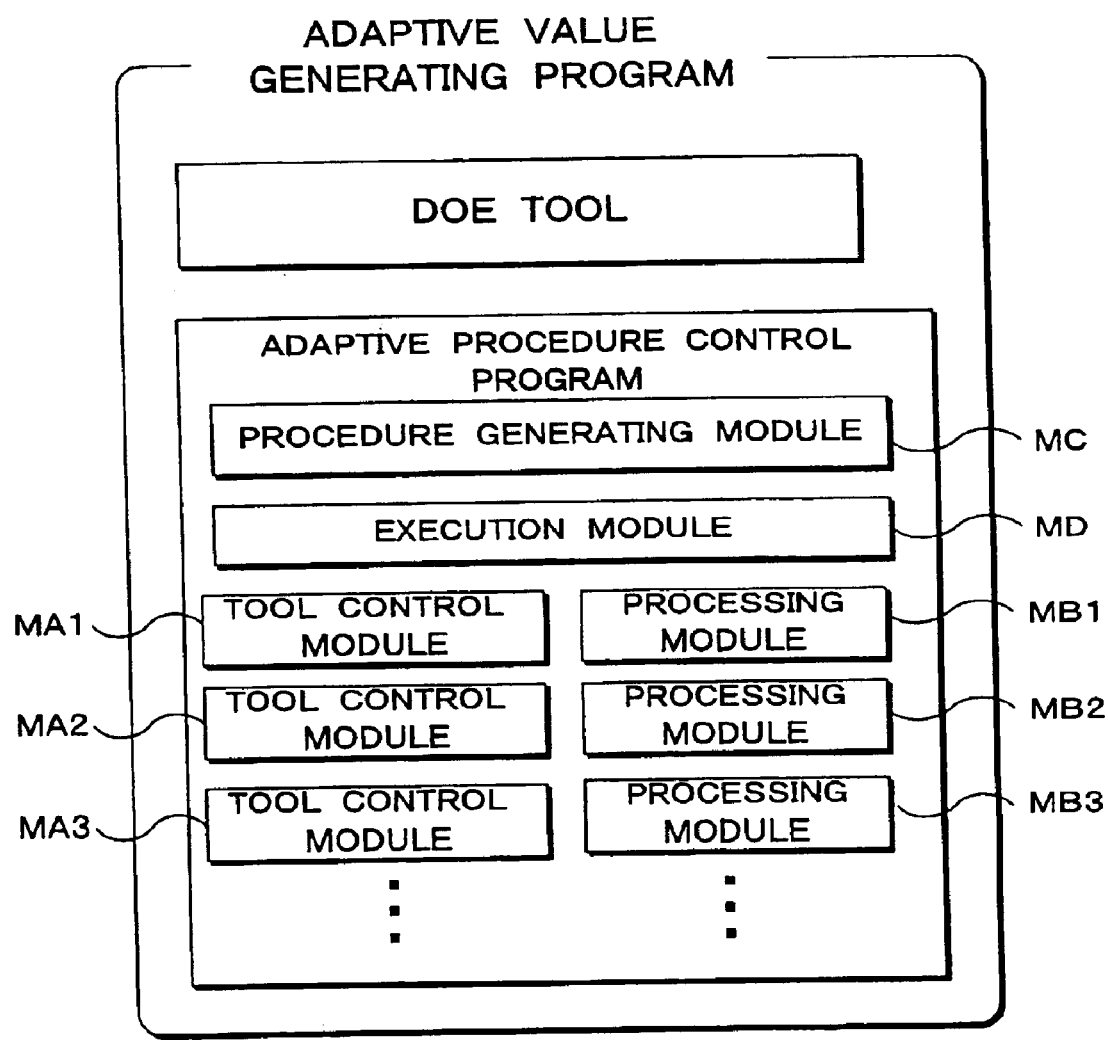
FIG. 2 is a conceptual diagram showing the structure of an adaptive value generating program.

In such an adaptive value generating system, the computer 1 executes an adaptive value generating program. FIG. 2 shows the structure of the adaptive value generating program. The adaptive value generating program has an adaptive procedure control program and a DOE (Design of Experiment) tool. The DOE tool is a general program having a statistical process function. Accordingly, the DOE tool is not limited for use in designing of an engine but can execute various statistical processes on the basis of experimental data. The DOE tool is constructed by a plurality of modules (not shown). Each of the modules can be used by being called from another program in accordance with a predetermined instruction.

On the other hand, the adaptive procedure control program is specialized to generate an adaptive value of the engine 3. The adaptive procedure control program has a plurality of tool control modules MA1, MA2, . . . , a plurality of processing modules MB1, MB2, . . . , a procedure generating module MC, and an execution module MD. Each of the tool control modules MA1, MA2, . . . has the function of inputting an instruction to the DOE tool and receiving the result of processing of the DOE tool. Each of the processing modules MB1, MB2, . . . has the functions of executing predetermined processes, such as a function of obtaining measurement data by controlling the measuring apparatus 2, a function of giving a predetermined instruction to the DOE tool on the basis of the measurement data, a function of evaluating a result of processing of the DOE tool, and the like. The procedure generating module MC has a function of selecting a module from the tool control modules MA1, MA2, . . . and the processing modules MB1, MB2, . . . on the basis of an output signal of the input device 14 and generating an execution procedure file which specifies an execution procedure of the selected module. The execution module MD has a function of executing a process in accordance with a procedure described in the execution procedure file and generating an adaptive value.

In other words, the adaptive procedure control program plays the role of a control center in the adaptive value generating system and functions as an interface between the measuring apparatus 2 and the DOE tool. The adaptive procedure control program has an advantage such that an adaptive procedure can be customized according to various circumstances such as an object to be controlled and required precision by the procedure generating module MC. The tool control modules MA1, MA2, . . . described in the execution procedure file appropriately call the module in the DOE tool and allows the called module to execute the process. Further, the processing modules MB1, MB2, . . . can use the result of the process for the next process.

By the adaptation procedure control program, a series of procedures for generating an adaptive value can be automated. The time required for adaptation can be greatly shortened and the number of processes performed by the operator can be reduced. Further, in the case of changing the measurement apparatus 2 and the case of changing the adaptive procedure, a whole adaptive value generating program is not newly developed but it is enough to correct only the adaptive procedure control program. There is consequently an advantage that various changes can be flexibly addressed.

Figure 3:
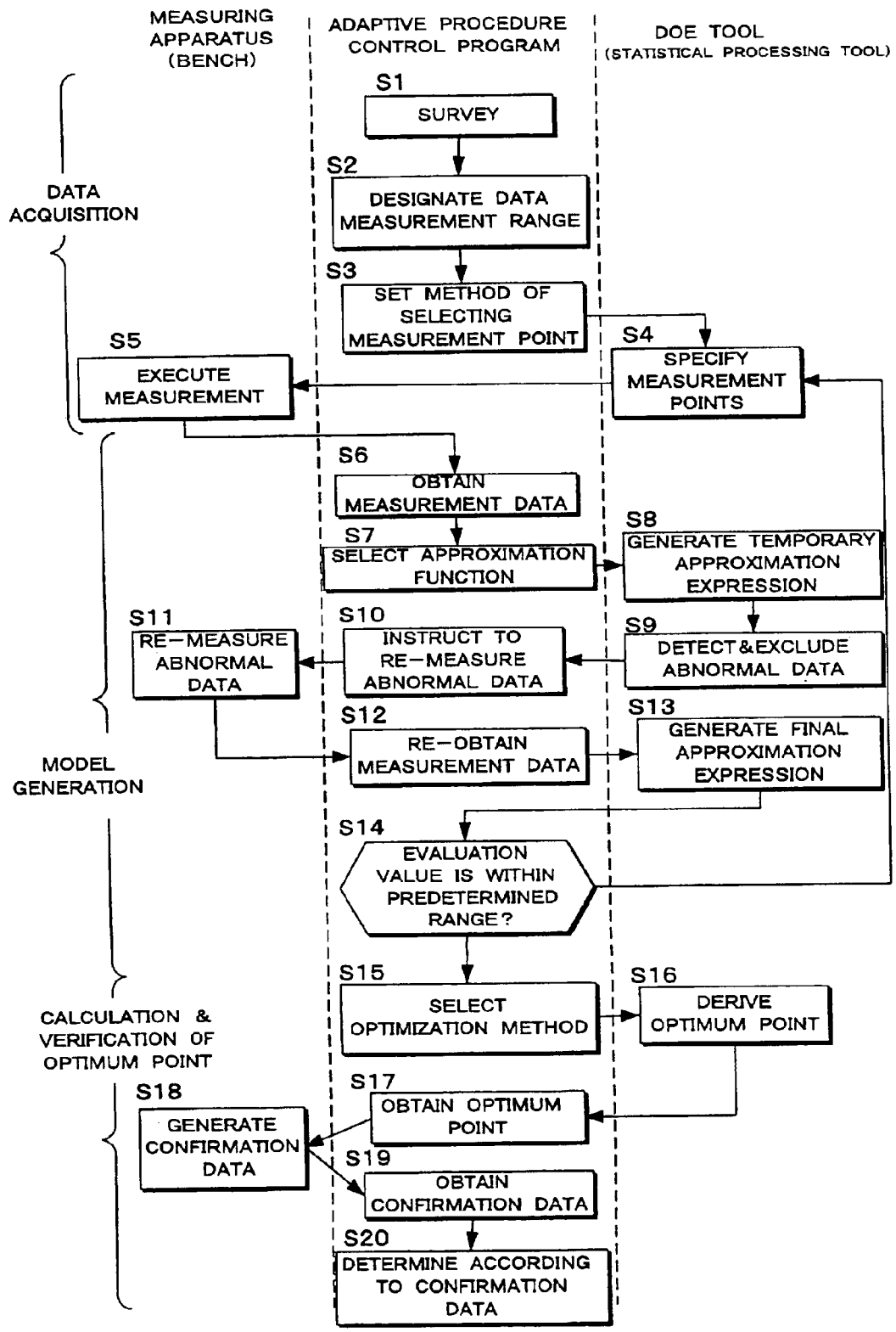
FIG. 3 is a flowchart showing the operations of the adaptive value generating system.

FIG. 3 is a flowchart showing the operation of the adaptive value generating system according to the execution procedure file. An adaptive value generating process is roughly divided into the following three processes: acquisition of measurement data of the engine 3, generation of a model, and calculation and verification of an optimum point. It will be described concretely hereinbelow.

First, when the execution module MD of the adaptive value generating program is started, processes are executed in accordance with a designated execution procedure file. In this example, first, a survey process is executed (step S1). In the survey process, various preconditions for generating an adaptive value are inputted by the operator. The CPU 10 displays an input screen on the display 15 and prompts the operator to fill in predetermined items.

In step S2, a data measurement range is designated. In this case, the CPU 10 displays a screen for designating the measurement range on the display 15 and prompts the operator's input. In this case, the operating conditions of the engine 3, the measurement range, and the number of measurement points are inputted by the operator.

Figure 4:
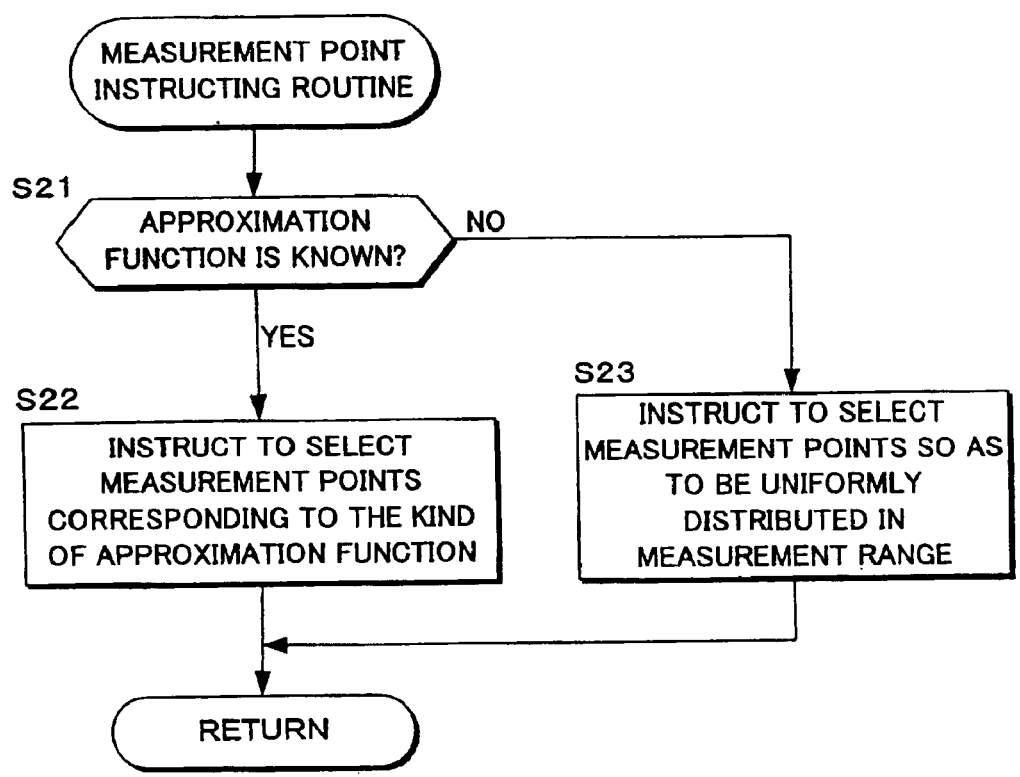
FIG. 4 is a flowchart showing the processes of a measurement point instructing routine.

After that, the CPU 10 executes a measurement point instructing routine, thereby setting a method of selecting a measurement point (step S3). FIG. 4 shows processes of the measurement point instructing routine. First, the CPU 10 determines whether an approximation function of the engine 3 is known or not (step S21). The case where the approximation function is known means that the approximation function of an engine of the same type has been already obtained and it has been determined in the survey process that the function is to be used. The case where the approximation function is known means that the CPU 10 generates an instruction to select measurement points corresponding to the kind of the function (step S22). On the other hand, when the approximation function is unknown, the CPU 10 generates an instruction to select measurement points so that the measurement points are uniformly distributed within the measurement range (step S23).

Figure 5:
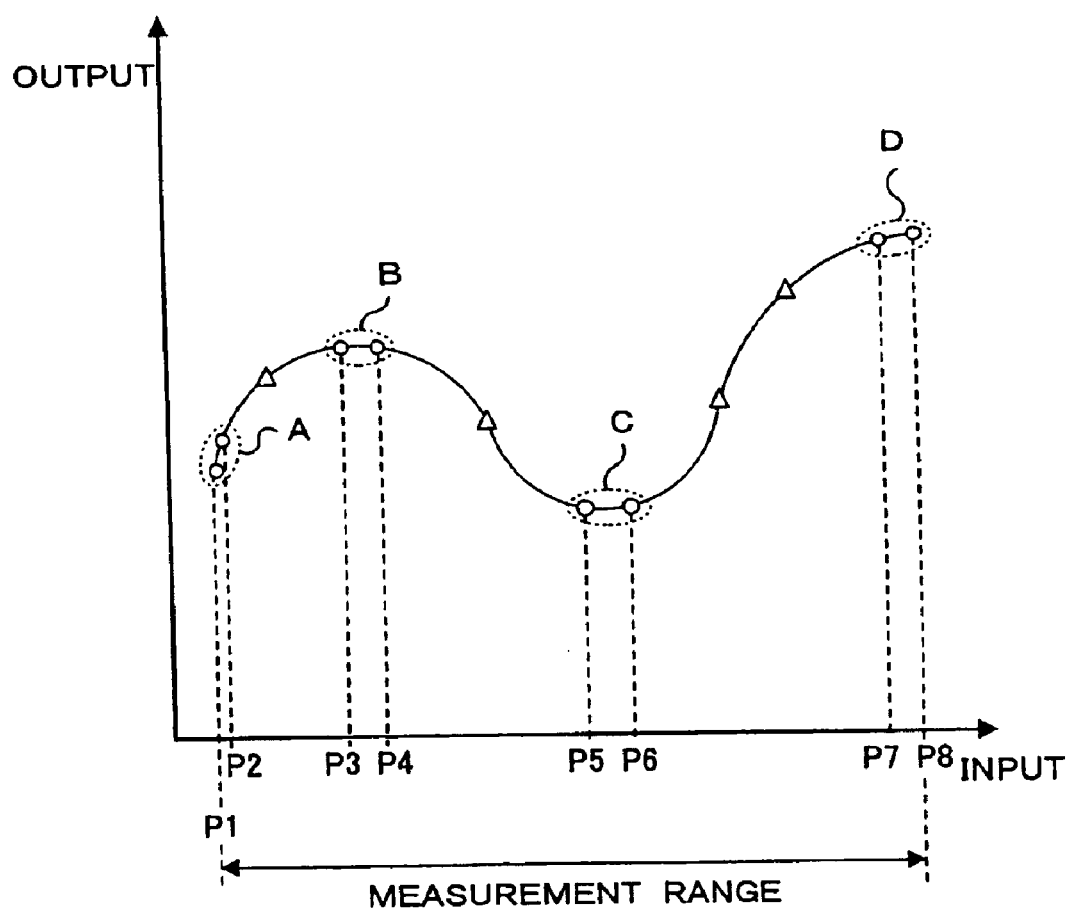
FIG. 5 is a graph showing the relation between input/output characteristics of an approximation function and measurement points.

Referring again to FIG. 3, when the instruction indicative of method of selecting the measurement points is given to the DOE tool, the DOE tool specifies the measurement points in accordance with the instruction (step S4). The instruction includes information indicative of the number of measurement points. In the case where the instruction for selecting the measurement points in accordance with the kind of the function, the DOE tool sets many measurement points at both ends of the measurement range and around inflection points. For example, if the input/output characteristics of the approximation function are as shown in FIG. 5, measurement points P1, P2, . . . , and P8 are set at both ends A and D of the measurement range and around inflection points B and C. The reason is that the approximation function is corrected by a statistical process, and if information at the inflection points are missing, the precision of correction deteriorates. On the other hand, when the DOE tool receives an instruction to distribute uniformly the measurement points within the measurement range, the DOE tool sets the measurement points so as to be uniformly distributed within the measurement range. After that, the DOE tool generates measurement instruction data indicative of each measurement point.

In FIG. 3, a process of transferring the measurement instruction data to the measuring apparatus 2 by the adaptive procedure control program is not clearly shown. However, the adaptive procedure control program has the function of communication between the measuring apparatus 2 and the computer 1, so that, in reality, the adaptive procedure control program receives the measurement instruction data and transmits the received data to the measuring apparatus 2. When the data format of the DOE tool and that of the measuring apparatus 2 are different from each other, the adaptive procedure control program converts the data format of the measurement instruction data and transmits the resultant to the measuring apparatus 2.

After the measurement instruction data is transferred from the computer 1 to the measuring apparatus 2, the measuring apparatus 2 executes the measurement as an actual apparatus (step S5). In this process, the measuring apparatus 2 measures the state of the engine 3 at each of measurement points indicated by the measurement instruction data and generates measurement data indicative of a measurement result. After completion of the measurement, the measuring apparatus 2 transmits the measurement data to the computer 1.

In the process up to the data acquisition, designation of the data measurement range (step S2) and setting of the measurement point selecting method (step S3) are executed by the adaptive procedure control program. It is therefore enough for the operator to fill in the minimum items necessary for data acquisition by operating the input device 14. Thus, the processing time up to the data acquisition with the actual apparatus can be greatly shortened. An error in the measurement instruction due to miss-operations of the operator can be prevented.

Figure 6:
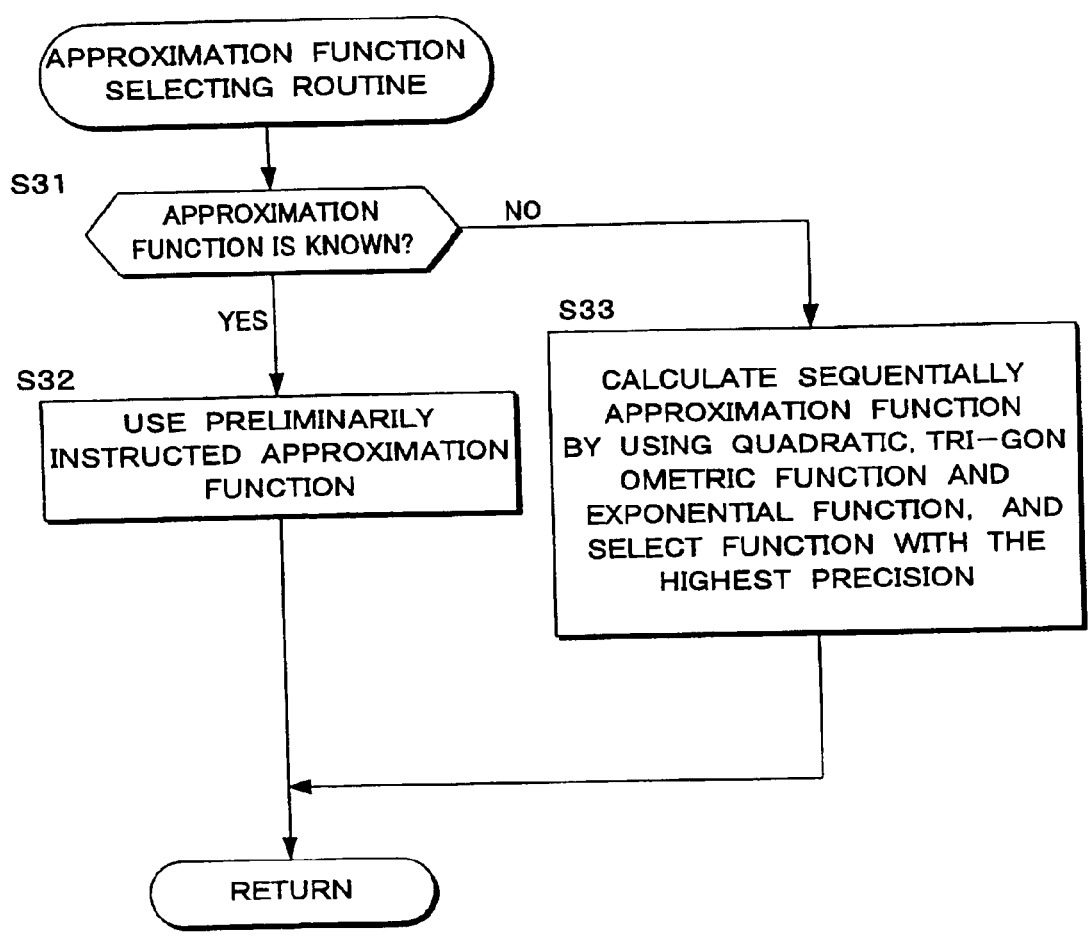
FIG. 6 is a flowchart showing the processes of an approximation function selecting routine.

When the computer 1 obtains the measurement data (step S6), the CPU 10 executes selection of an approximation function in accordance with the adaptive procedure control program (step S7). At this time, the CPU 10 executes an approximation function selecting routine shown in FIG. 6. First, the CPU 10 determines whether an approximation function is known or not (step S31). If the approximation function is known, a preliminarily instructed approximation function is used (step S32). On the other hand, if the approximation function is unknown, an approximation expression is sequentially calculated by using a quadratic, a trigonometric function, an exponential function and the like, and a function of the highest approximation precision can be selected (step S33). After the approximation function is determined, the adaptive procedure control program designates the approximation function to the DOE tool.

In the case where the approximation function is unknown, the adaptive procedure control program may display the kinds of approximation functions on the display 15 and prompts the operator to select one of the kinds of approximation functions. Further, the adaptive procedure control program may display a graph of measurement data on the display 15. By the display, the operator can easily select an approximation function. In other words, the kinds of approximation functions and the graph of measurement data function as information for helping the operator to designate the approximation function.

Figure 7:
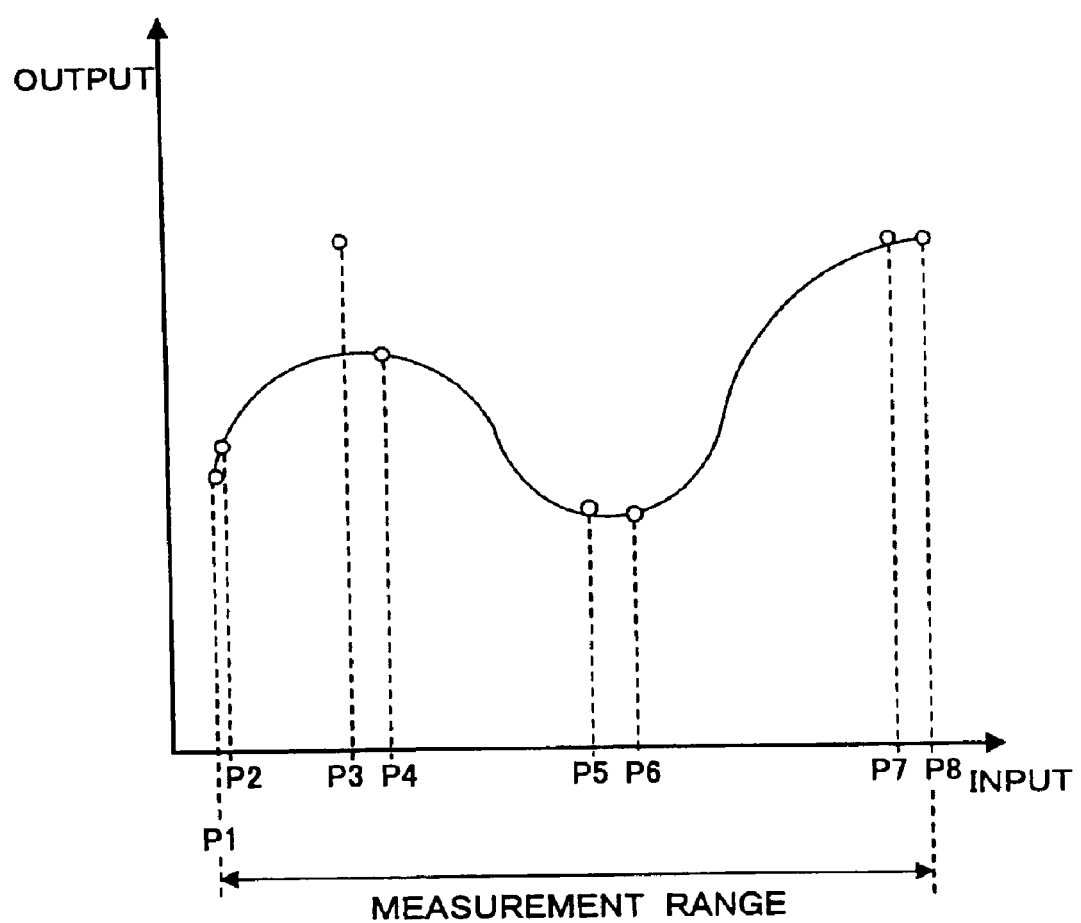
FIG. 7 is a graph showing the relation between abnormal data and a temporary approximation expression.

When the DOE tool receives the designation of the approximation function and the measurement data, the DOE tool generates a temporary approximation expression on the basis of the approximation function (step S8). In this case, the adaptive procedure control program designates the approximation function in a data format which can be interpreted by the DOE tool and also passes the measurement data. The approximation function includes at least one parameter. The DOE tool performs a statistical process on the measurement data and determines the parameters. As a method of the statistical process, for example, the least-squares method can be adopted. After that, the DOE tool compares the data calculated by using the temporary approximation expression with measurement data, detects abnormal data, and excludes the abnormal data (step S9). For example, a case is assumed in which a curve shown by the solid line in FIG. 7 is obtained by the temporary approximation expression and white circles show results of the measurement indicated as the measurement data. In this case, a measurement point P3 is largely deviated from the temporary approximation expression. Therefore, measurement data at the measurement point P3 is detected as abnormal data. One of methods of detecting abnormal data is a method of detecting, as abnormal data, a measurement point at which the difference between a calculation value obtained by a temporary approximation expression and a measurement value indicated by measurement data is the largest. Alternately, it is also possible to set a permissible numerical value range (for example, ±3%) of a calculation value obtained by the temporary approximation and, when a measurement value of measurement data is outside of the numerical value range, recognize the measurement value as abnormal data.

When the adaptive procedure control program receives the abnormal data from the DOE tool, the adaptive procedure control program instructs the measuring apparatus 2 to re-measure the abnormal data (step S10). After that, the measuring apparatus 2 re-measures the abnormal data (step S11) and transmits measurement data indicative of a result of re-measurement to the computer 1. In the example shown in FIG. 7, the re-measurement is executed with respect to the measurement point P3.

The adaptation control program obtains the measurement data (step S12) and transmits it to the DOE tool. The DOE tool generates a final approximation expression with the re-measured data instead of the abnormal data (step S13). Namely, on the basis of data obtained by excluding the abnormal data from the measurement data and the re-measured data, the final approximation expression is generated. In this case, the process of determining the parameters by performing the statistical process on the approximation function is performed in the same way of steps S8. The final approximation expression expresses the behavior of the engine 3 more accurately than the temporary approximation expression.

Figure 8:
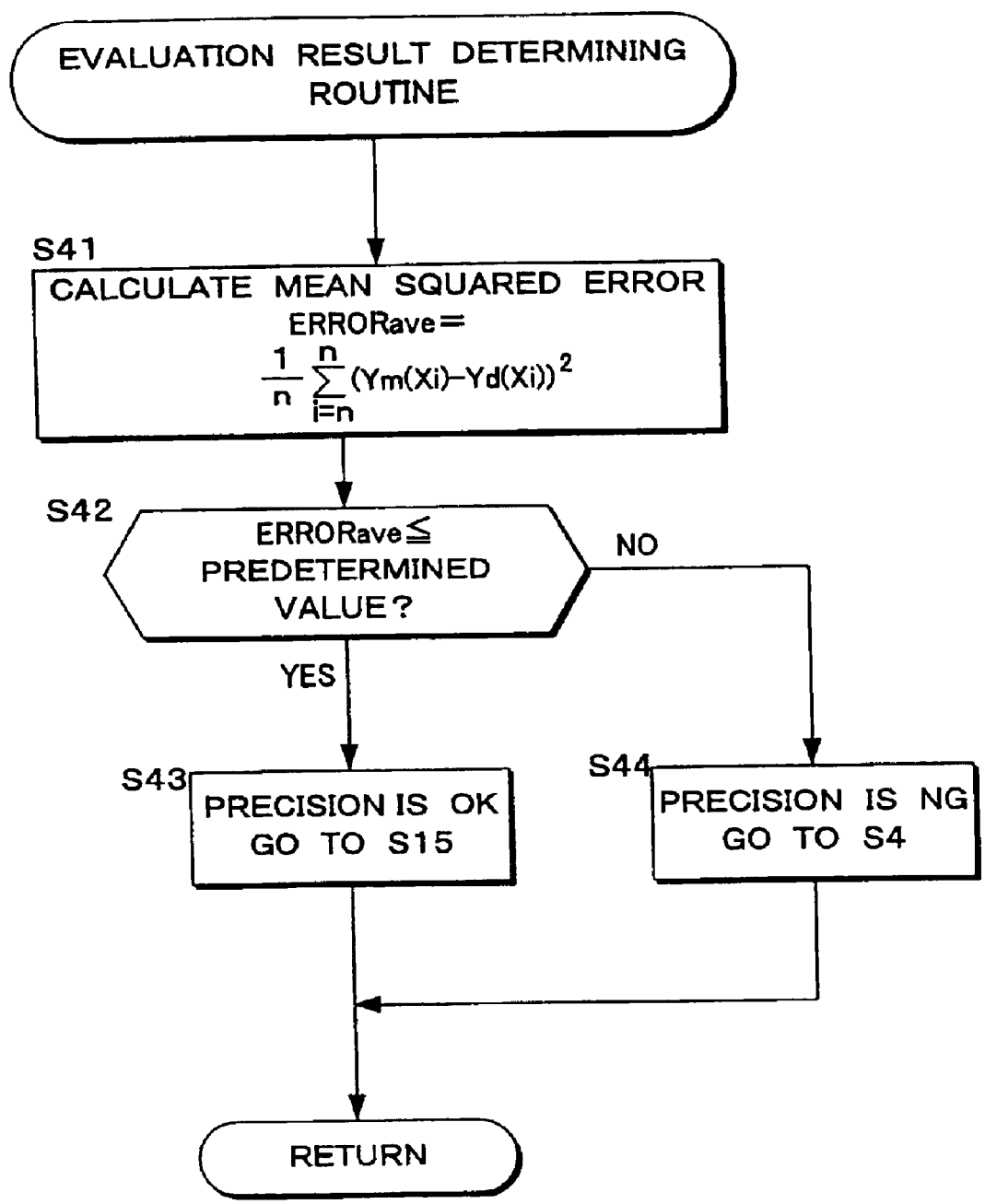
FIG. 8 is a flowchart showing the processes of an evaluation result determining routine.

The DOE tool generates the final approximation expression and transmits it to the adaptive procedure control program. The adaptive procedure control program executes an evaluation result determining routine, thereby evaluating precision of the final approximation expression (step S14). In this process, an error between a calculation value of the final approximation expression and the measurement value of the actual apparatus is calculated as an evaluation value and whether the evaluation value is within a predetermined range or not is determined. FIG. 8 shows processes of the evaluation result determining routine. First, the CPU 10 calculates a mean squared error ERRORave in accordance with the following equation 1 (step S41). Yd(Xi) denotes a measurement value under an operating condition Xi. Ym(Xi) denotes a calculation value of the final approximation expression under the operating condition Xi.

$$ERRORave = \frac{1}{n}\sum_{i=n}^{n}(Ym(Xi)-Yd(Xi))^2 \qquad \text{Equation 1}$$

Next, the CPU 10 determines whether the mean squared error ERRORave is equal to or smaller than a predetermined value or not (step S42). In this case, the predetermined value is preliminarily determined as a permissible error limit. If the mean squared error ERRORave is equal to or smaller than the predetermined value, the CPU 10 determines that the precision of the final approximation expression is within the permissible range and advances to step S15 (step S43).

On the other hand, when the mean square error ERRORave exceeds the predetermined value, the CPU 10 determines that the precision of the final approximation is out of the permissible range. In this case, the CPU 10 returns to step S4 and re-specifies measurement points. Specifically, the CPU 10 sets, in addition to already measured measurement points, new measurement points. In the example shown in FIG. 5, points indicated by white triangles are set as the new measurement points. Consequently, measurement by the actual apparatus is executed with respect to the new measurement points and new measurement data is obtained (step S5). On the basis of the new measurement data and the already measured data, the processes from step S6 to S14 are executed. The final approximation expression generated after the evaluation can be used as a model for estimating the state of the engine 3 under predetermined condition with high precision.

In the model generating process, the adaptive control program executes selection of an approximation function and designates an approximation function in a data format which can be interpreted by the DOE tool, and measurement data is given in such a data format to the DOE tool. By using a statistical process function of the general DOE tool, parameters of the approximation expression can be determined. Moreover, the operator's work of inputting the approximation function itself or measurement data can be omitted, so that time required to generate a model can be greatly shortened. Further, with respect to abnormal data, re-measurement is executed without determination of the operator, so that a final approximation expression of high precision can be obtained in a short time. In addition, evaluation of an error with respect to a final approximation expression is automatically executed and, when the error is not permissible, new measurement points are added and the process is performed. Therefore, without wasting measurement results already obtained, the precision of the final approximation expression can be automatically improved.

In step S15, an optimization method is selected. In the process, selection from various algorithms of the DOE tool is executed. There are various optimization methods. The DOE tool of this example has three kinds of algorithms corresponding to the steepest descent method, Newton method, and successive quadratic programming. The selection of algorithm is automatically executed in accordance with the kind of the approximation function, for an algorithm for optimizing at high precision varies according to the kind of approximation function. Specifically, the adaptive procedure control program has data indicative of correspondence between the kind of approximation function and an algorithm, and an algorithm is selected with reference to the data. The adaptive procedure control program may display information to specify algorithms on the display 15 to prompt the operator to select an algorithm. A final approximation expression may be displayed together with the information to specify algorithms. In this case, the operator can select an algorithm while referring to the final approximation expression, so that selection can be performed in consideration of circumstances such as precision and computation time.

After that, the DOE tool derives an optimum point in accordance with the selected optimization method (step S16). In this example, an optimum point is derived in accordance with the algorithm selected from the steepest descent method, Newton method, and successive quadratic programming.

After the adaptive procedure control program obtains the derived optimum point from the DOE tool, the adaptive procedure control program specifies measurement points at/around the optimum point (step S17). It is now assumed that an object of the control is to minimize a fuel injection amount under a certain operating condition, the operating condition is X, an actual measurement value of a fuel injection amount is Yd, and a calculation value of the fuel injection amount calculated by using the final approximation expression is Ym. In this case, the optimum point is given under an operating condition Xopt of minimizing the fuel injection amount, and the minimum fuel injection amount by the final approximation expression is given by Ym(Xopt). When a predetermined value is $\epsilon$, measurement points designated in step S17 are Xopt−$\epsilon$, Xopt, and Xopt+$\epsilon$.

After that, a measurement instruction is transmitted from the computer 1 to the measuring apparatus 2. The measurement instruction includes information indicative of the measurement points. When the measurement instruction is received by the measuring apparatus 2, the measuring apparatus 2 measures the engine 3 at each of the measurement points and generates confirmation data (step S18)

Figure 9:
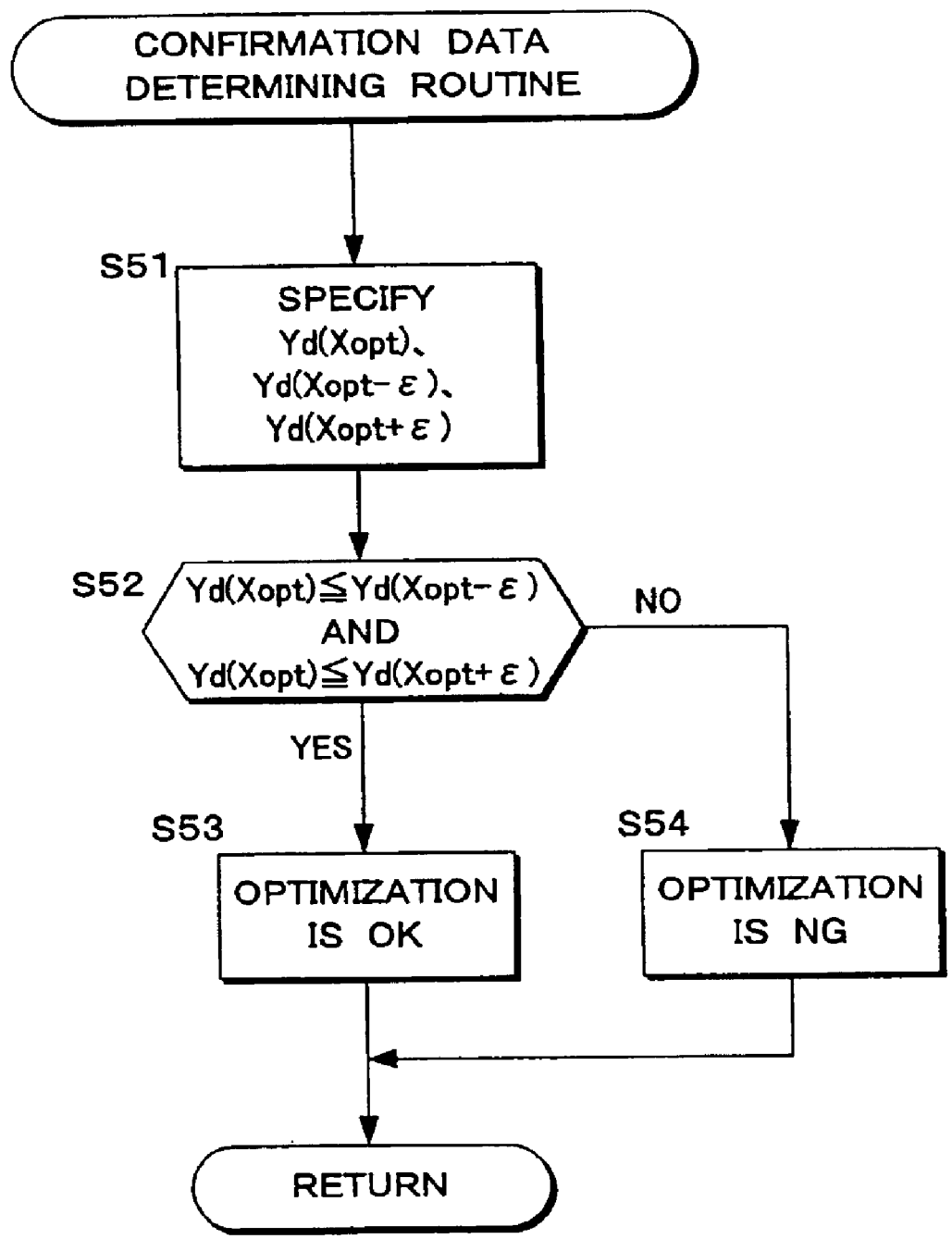
FIG. 9 is a flowchart showing the processes of a confirmation data determining routine.
Figure 10:
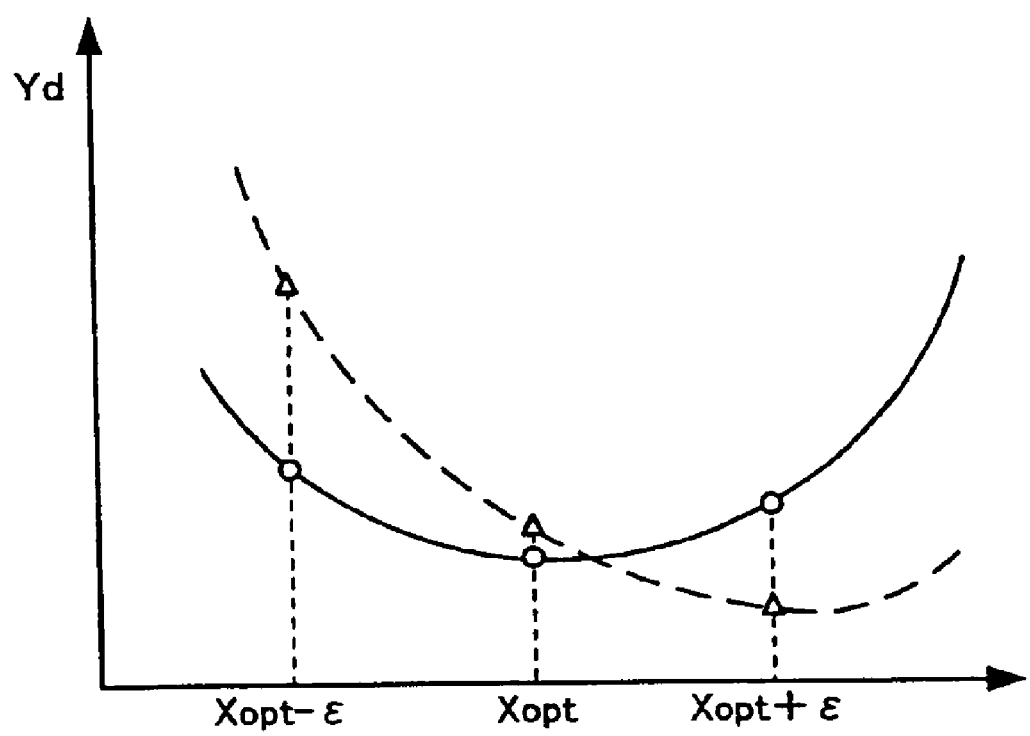
FIG. 10 is a graph showing the relation between an optimum point and the characteristic of an actual measurement value.

When the confirmation data is transmitted from the measuring apparatus 2 to the computer 1, the adaptive procedure control program obtains the confirmation data (step S19). Next, whether the optimum point is proper or not is determined on the basis of the confirmation data (step S20). In this process, a confirmation data determining routine is executed. FIG. 9 shows processes of the confirmation data determining routine. First, three pieces of the confirmation data Yd(Xopt−$\epsilon$), Yd(Xopt), and Yd(Xopt+$\epsilon$) are specified (step S51). After that, whether the relations of Yd(Xopt) ≦Yd(Xopt−$\epsilon$) and Yd(Xopt)≦Yd(Xopt+$\epsilon$) are satisfied or not is determined (step S52). In other words, it is confirmed whether the optimum point calculated by the final approximation expression is optimum in measurement of the actual apparatus or not. For example, in the case where the characteristic of the actual measurement value is as shown by the solid line shown in FIG. 10, optimization by the final approximation expression is proper. On the other hand, when the characteristic of the actual measurement value is like shown by a broken line shown in FIG. 10, the relation is Yd(Xopt)>Yd(Xopt+$\epsilon$), so that optimization by the final approximation expression is improper.

If a result of determination in step S52 is YES, it is determined that the optimization is proper, and the optimum point is adopted as an adaptive value meeting the purpose of the control (step S53). On the other hand, if a result of determination in step S52 is NO, the approximation function is changed and the program returns to step S3 shown in FIG. 3 (step S54). Consequently, on the basis of a new approximation function, the data acquisition, the model generation, and the calculation and verification of the optimum point are automatically executed. In this case, in the process of specifying the measurement points in step S4, on precondition that the measured data, which have been already measured, is used in step S8, only new measurement points may be specified.

In the process of calculating and verifying the optimum point, the adaptive procedure control program can automatically execute optimization, calculation of an optimum point, and verification of the optimum point, so that the load of the operation can be reduced. As a result, the time required for calculation and verification of the optimum point can be greatly shortened. In the case where the optimum point is not permitted, the approximation function is changed and the series of processes can be automatically executed again. Further, since the optimum point is derived by using a general DOE tool, it is unnecessary to develop a program specialized for a specific object and the adaptive value generation program can be provided at low price.

Figure 11:
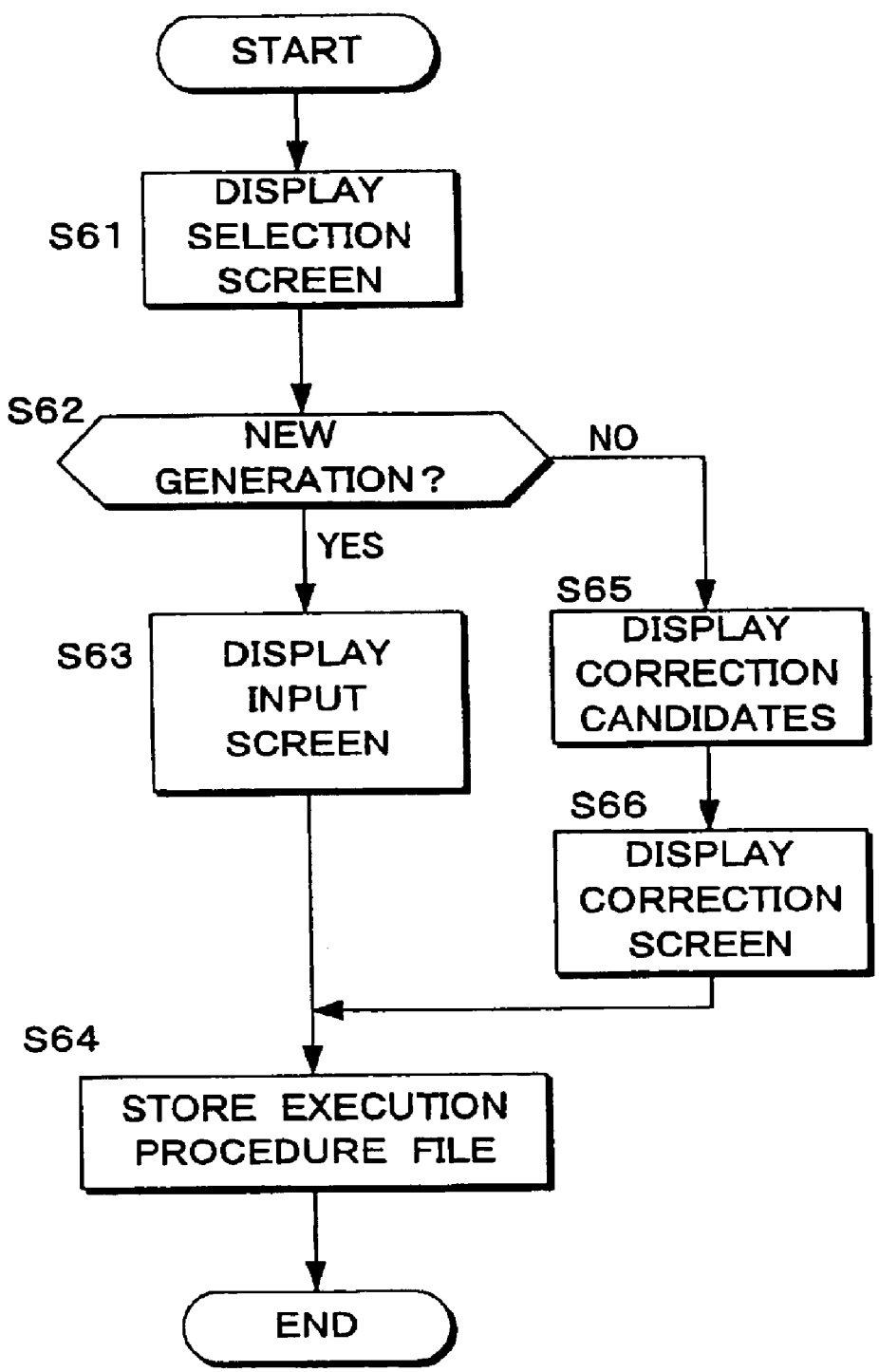
FIG. 11 is a flowchart showing the processes of a procedure generating module.

FIG. 11 shows processes of the procedure generating module MC. The procedure generating module MC is started when adaptive procedure generation is selected on the menu screen of the adaptive value generating program.

Figure 12:
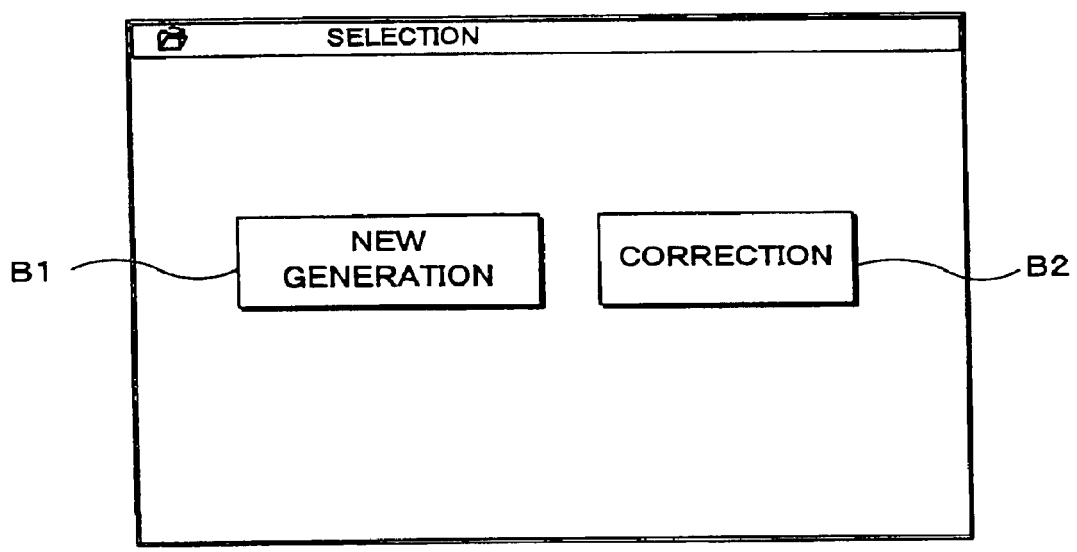
FIG. 12 is a diagram illustrating an example of a selection screen.

First, the CPU 10 displays a selection screen to select new generation or correction on the display 15 and prompts the operator for selection (step S61). FIG. 12 shows an example of the selection screen. The CPU 10 determines whether the operator has selected new generation or not on the basis of an output signal of the input device 14 (step S62). When the operator operates a mouse to click a button B1 on the selection screen, the CPU 10 advances to step S63 and displays an input screen on the display 15.

Figure 13:
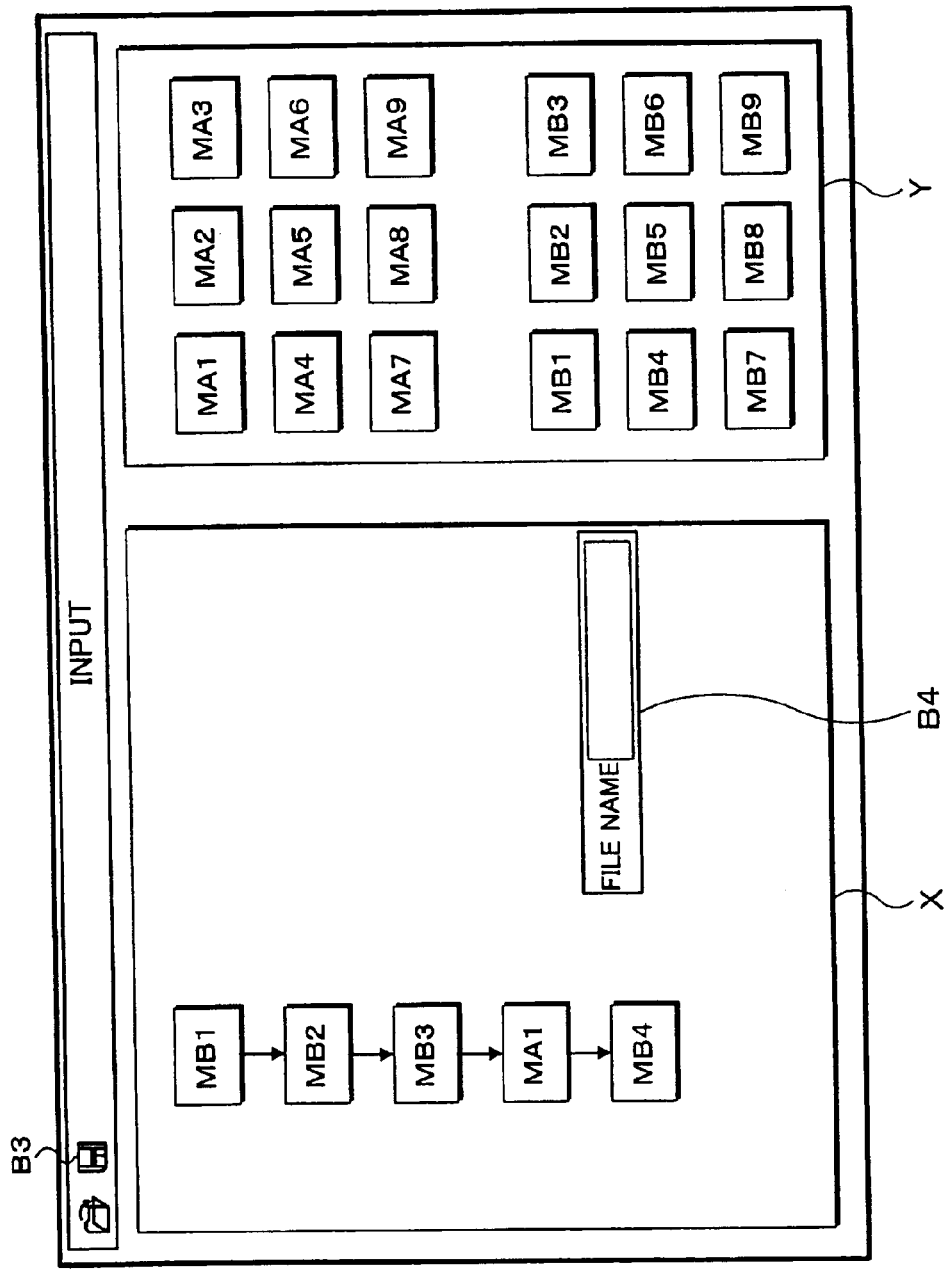
FIG. 13 is a diagram illustrating an example of an input screen.

FIG. 13 shows an example of the input screen. The input screen is divided into a work area X and a display area Y. In the display area Y, icons indicative of the module names of the registered tool control modules MA1, MA2, . . . , and processing modules MB1, MB2, . . . are displayed. The icons can be copied into the work area X by drag and drop with the mouse. The operator can designate the execution order of selected modules by generating a flowchart showing the adaptation procedure in the work area X.

For example, with respect to the processing modules MB1, MB2, . . . , it is assumed that the processing module MB1, MB2, MB3, and MB4 executes a survey process, a process of designating a data measurement range, a process of setting a measurement point selecting method, and an actual measurement process respectively. It is also assumed that the tool control module MA1 specifies measurement points by using the DOE tool. In this case, the processes for data acquisition shown in FIG. 3 are specified by generating a flowchart shown in the work area X of FIG. 13. When the tool control modules and the processing modules are used, the operator can easily generate a program for controlling the adaptive procedure without knowledge of a data format of the DOE tool and a communication protocol with the measuring apparatus 2.

When the operator clicks a store button B3, an entry box B4 for inputting an execution procedure file name is displayed in the input screen. When the operator enters a file name in the entry box B4 and operates the return key, the execution procedure file name and the execution procedure file are associated with each other and stored (step S64).

On the other hand, when the operator selects correction in the input screen shown in FIG. 12, a result of determination in step S62 becomes NO. The CPU 10 reads out execution procedure file names already generated and displays them as correction candidates on the display 15 (step S65). When the operator selects one of correction candidates, the CPU 10 detects it and displays a correction screen (step S66). The correction screen is the same as the input screen shown in FIG. 13 except for the point that a flowchart corresponding to the execution procedure file name selected is displayed in the work area X. The operator makes a necessary correction on the flowchart. After that, when the store button B3 is clicked, the entry box for entering an execution procedure file name is displayed on the input screen. If a new file name is entered, the file is stored as another file. If the same file name is entered, the execution procedure file is updated (step S64).

By executing the procedure generating module MC by the CPU 10, the tool control modules MA1, MA2, . . . and the processing modules MB1, MB2, . . . are appropriately combined and the adaptation procedure can be customized in accordance with various circumstances such as an object to be controlled and required precision. A tool control module and a processing module can be newly added. In such a case, a part of the existing tool control module or processing module may be corrected.

As described above, in the foregoing embodiment, the adaptive procedure control program can appropriately call a module of a general DOE tool and automatically perform the adaptation procedure, so that the optimized adaptive value can be obtained in a short time. In addition, the adaptation procedure can be customized by a simple method.

In the foregoing embodiment, the CPU 10 functions as an adapting device of the present invention when the adaptive procedure control program is executed, and functions as a statistical processing device of the invention when the DOE tool is executed.

In the foregoing embodiment, the adaptive value generating system in which the object to be controlled is an engine of a vehicle has been described. The invention however is not limited to the system and the object to be controlled may be anything. The invention can be applied to generation of a model for estimating the state of an object and deriving of an optimized adaptive value by using the model.

In the foregoing embodiment, a module of the DOE tool (statistical processing tool) is appropriately called and executed. Obviously, the module can be described in a source code of the adaptive procedure control program and functioned as a program. Since the process for transmitting/receiving data between programs can be omitted, execution time can be shortened.

As described above, according to the adaptive value generating apparatus of the present invention, the adapting device can obtain an approximation expression by using the statistical processing device as a general part for determining parameters, so that the process for obtaining an approximation expression can be automated. Since the adaptive value is generated by using an approximation expression when the precision of the approximation expression is sufficiently high, a very precise adaptive value can be generated and the approximation expression evaluating process can be automated. As a result, time required to generate an adaptive value can be greatly shortened.

What is claimed is:

1. An adaptive value generating apparatus for generating an adaptive value for controlling an object under a predetermined control condition, comprising:
    a statistical processing device for executing a statistical process when a set of an input value and an output value and a function including at least one parameter are designated, thereby determining a value of the parameter so that a calculation value of the function corresponding to the input value comes close to the output value and generating an approximation expression; and
    an adapting device for determining an approximation function for estimating a state of the object, outputting information designating the determined approximation function to the statistical processing device, outputting a measurement value, which is obtained by measuring the state of the object under the predetermined control condition, as the output value and the predetermined control condition as the input value to the statistical processing device, evaluating precision of the approximation expression on the basis of the calculation value and the measurement value when the approximation expression is received from the statistical processing device, and generating the adaptive value by using the approximation expression in the case where an error is within a predetermined range.

2. The adaptive value generating apparatus according to claim 1, further comprising:
    a presenting device for presenting information to a user, thereby prompting an input; and
    an input device for outputting an output signal according to operation of the user,
    wherein the adapting device makes the presenting device present information which helps the user to designate the approximation function, and determines the approximation function on the basis of the output signal.

3. The adaptive value generating apparatus according to claim 2, wherein the adapting device stores a plurality of approximation functions and the information which helps the user to designate the approximation function is information indicative of the plurality of approximation functions.

4. The adaptive value generating apparatus according to claim 3, wherein the object is an engine used for a vehicle, and the predetermined control condition is an operating condition of the engine.

5. The adaptive value generating apparatus according to claim 2, wherein the object is an engine used for a vehicle, and the predetermined control condition is an operating condition of the engine.

6. The adaptive value generating apparatus according to claim 1, wherein the statistical processing device derives an optimum point by using the approximation expression in accordance with a designated optimization method and outputs the optimum point to the adapting device, and
    the adapting device outputs information to designate the optimization method to the statistical processing device and settles the optimum point obtained from the statistical processing device as the adaptive value.

7. The adaptive value generating apparatus according to claim 6, wherein the adapting device outputs the information to designate the optimization method to the statistical processing device, determines whether the optimum point obtained from the statistical processing device satisfies a predetermined condition or not on the basis of a measurement value obtained by measuring the object and, when the predetermined condition is satisfied, settles the optimum point as the adaptive value.

8. The adaptive value generating apparatus according to claim 7, wherein the object is an engine used for a vehicle, and the predetermined control condition is an operating condition of the engine.

9. The adaptive value generating apparatus according to claim 6, wherein the adapting device generates the information to designate the optimization method according to the approximation function.

10. The adaptive value generating apparatus according to claim 9, wherein the object is an engine used for a vehicle, and the predetermined control condition is an operating condition of the engine.

11. The adaptive value generating apparatus according to claim 6, further comprising:
a presenting device for presenting information to a user, thereby prompting an input; and
an input device for outputting an output signal according to operation of the user,
wherein the adapting device pre-stores kinds of optimization methods which can be used by the statistical processing device, makes the presenting device present information indicative of the kinds of the optimization methods, and generates the information to designate the optimization method on the basis of the output signal.

12. The adaptive value generating apparatus according to claim 11, wherein the object is an engine used for a vehicle, and the predetermined control condition is an operating condition of the engine.

13. The adaptive value generating apparatus according to claim 6, wherein the object is an engine used for a vehicle, and the predetermined control condition is an operating condition of the engine.

14. The adaptive value generating apparatus according to claim 1, wherein the object is an engine used for a vehicle, and the predetermined control condition is an operating condition of the engine.

15. An adaptive procedure control program for generating an adaptive value for controlling an object under a predetermined control condition by using a statistical processing tool which makes a computer execute a statistical process,
wherein when a set of an input value and an output value and a function including at least one parameter are designated, the statistical processing tool determines the value of the parameter so that a calculation value of the function to the input value comes close to the output value, and generates an approximation expression in the computer, and
the adaptive procedure control program makes the computer execute the steps of:
determining an approximation function for estimating a state of the object;
outputting information to designate the determined approximation function to the statistical processing tool;
outputting a measurement value, which is obtained by measuring the state of the object under the predetermined control condition, as the output value, and the predetermined control condition as the input value to the statistical processing tool;
evaluating precision of the approximation expression on the basis of the calculation value and the measurement value; and,
generating the adaptive value by using the approximation expression when an error is within a predetermined range.

16. An adaptive value generating program for generating an adaptive value for controlling an object under a predetermined control condition, which makes a computer execute the steps of:
determining an approximation function which includes at least one parameter and estimates a state of the object;
inputting the predetermined control condition to the approximation function and obtaining a calculation value;
determining the parameter so that the calculation value comes close to a measurement value obtained by measuring the state of the object under the predetermined control condition, thereby generating an approximation expression; and
evaluating precision of the approximation expression on the basis of the calculation value and the measurement value and, when an error is within a predetermined range, generating the adaptive value by using the approximation expression.

17. An adaptive value generating program for making a computer, having an input device for outputting an output signal according to an operation of a user, generate an adaptive value for controlling an object under a predetermined control condition,
wherein the adaptive value generating program includes a statistical processing tool and an adaptive procedure control program for making the computer function as a device for executing a statistical process in accordance with an instruction and outputting a result of the process, and
the adaptive procedure control program includes:
a plurality of tool control modules for making the computer function as a device for inputting the instruction to the statistical processing tool and also receiving the result of the process;
a plurality of processing modules for making the computer function as a device for executing a predetermined process;
a procedure generating module for making the computer function as a device for selecting modules from the tool control modules and the processing modules on the basis of the output signal, and generating an execution procedure file to specify an executing order of the selected modules; and
an execution module for making the computer function as a device for detecting execution of the execution procedure file on the basis of the output signal, executing a process in accordance with a procedure written in the execution procedure file, and generating the adaptive value.

18. The adaptive value generating program according to claim 17, wherein the computer has a display device, and
at least one of the plurality of processing modules, as the predetermined process, makes the display device display an input screen for prompting the user to input a predetermined instruction, receives the predetermined instruction on the basis of the output signal, and generates the instruction to be given to at least one of the tool control modules on the basis of the predetermined instruction.

19. The adaptive value generating program according to claim 17, wherein the computer can transmit a measurement instruction to a measuring apparatus for measuring a state of the object and receive a measurement result, and
at least one of the plurality of processing modules, as the predetermined process, generates the measurement instruction, transmits the measurement instruction to the measuring apparatus, and receives the measurement result from the measuring apparatus.

* * * * *